United States Patent
DeMars

[11] Patent Number: 5,855,163
[45] Date of Patent: Jan. 5, 1999

[54] COFFEE BREWER

[76] Inventor: Robert A. DeMars, 23221 Ladrillo Ave., Woodland Hills, Calif. 91367

[21] Appl. No.: 977,420
[22] Filed: Nov. 24, 1997

Related U.S. Application Data

[63] Continuation-in-part of Ser. No. 763,545, Dec. 10, 1996, abandoned.

[51] Int. Cl.$^6$ ...................................................... A47J 31/00
[52] U.S. Cl. ................................ 99/291; 99/304; 99/307; 219/446; 219/480; 392/444
[58] Field of Search .............................. 99/291, 298, 304, 99/307, 288; 219/446, 445, 480; 392/441, 442, 444; 220/4.27, 23.4; 222/129, 144.5, 466, 146.5

[56] References Cited

U.S. PATENT DOCUMENTS

| | | | |
|---|---|---|---|
| 3,326,115 | 6/1967 | Karlen et al | 99/291 |
| 4,155,291 | 5/1979 | Ryckman, Jr. et al. | 219/446 |
| 4,178,842 | 12/1979 | Vitous | 99/304 X |
| 4,531,046 | 7/1985 | Stover | 219/297 |
| 4,611,112 | 9/1986 | Schreder | 219/445 |
| 4,651,900 | 3/1987 | Horvath et al. | 222/144.5 |
| 4,802,406 | 2/1989 | Bouldin | 99/295 |

Primary Examiner—Reginald L. Alexander
Attorney, Agent, or Firm—Jack C. Munro

[57] ABSTRACT

A single unit coffee brewer for simultaneous brewing of two different types of coffee which utilizes carafes that in appearance resemble a single carafe but in actuality are constructed of two separate carafes. Each carafe receives brewed coffee from a separate filter basket with each filter basket to receive water from its own separate water tank. The water of each water tank is to be moved through a water supply conduit that is unique to that water tank to which it is affixed. The conduits and water of both water tanks and the warming plate assembly are to be heated by a heater assembly mounted within the base of the coffee brewer. There is a separate heater unit of the heater assembly for each separate warming plate with there being multiple separate warming plates within the warming plate assembly.

16 Claims, 7 Drawing Sheets

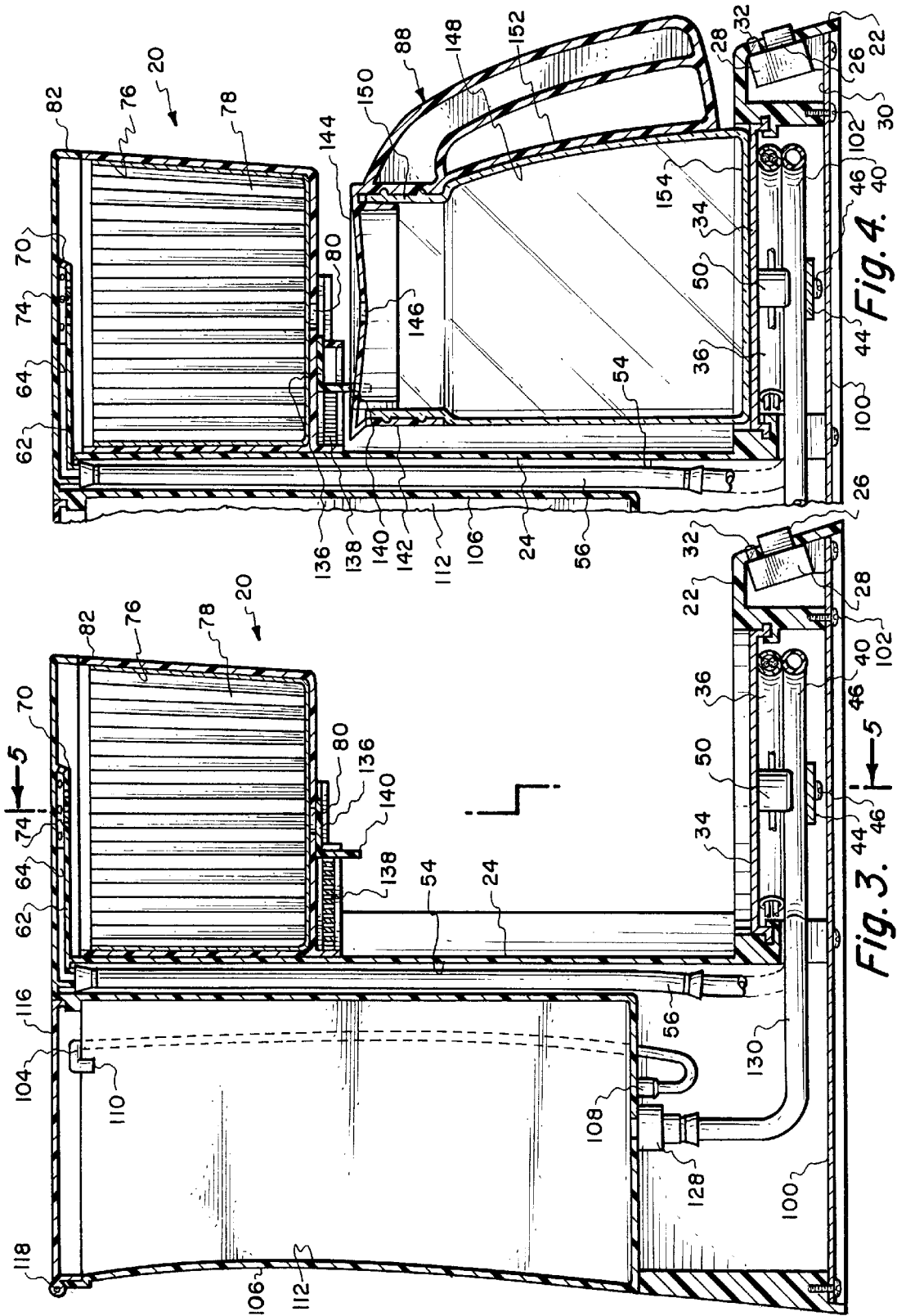

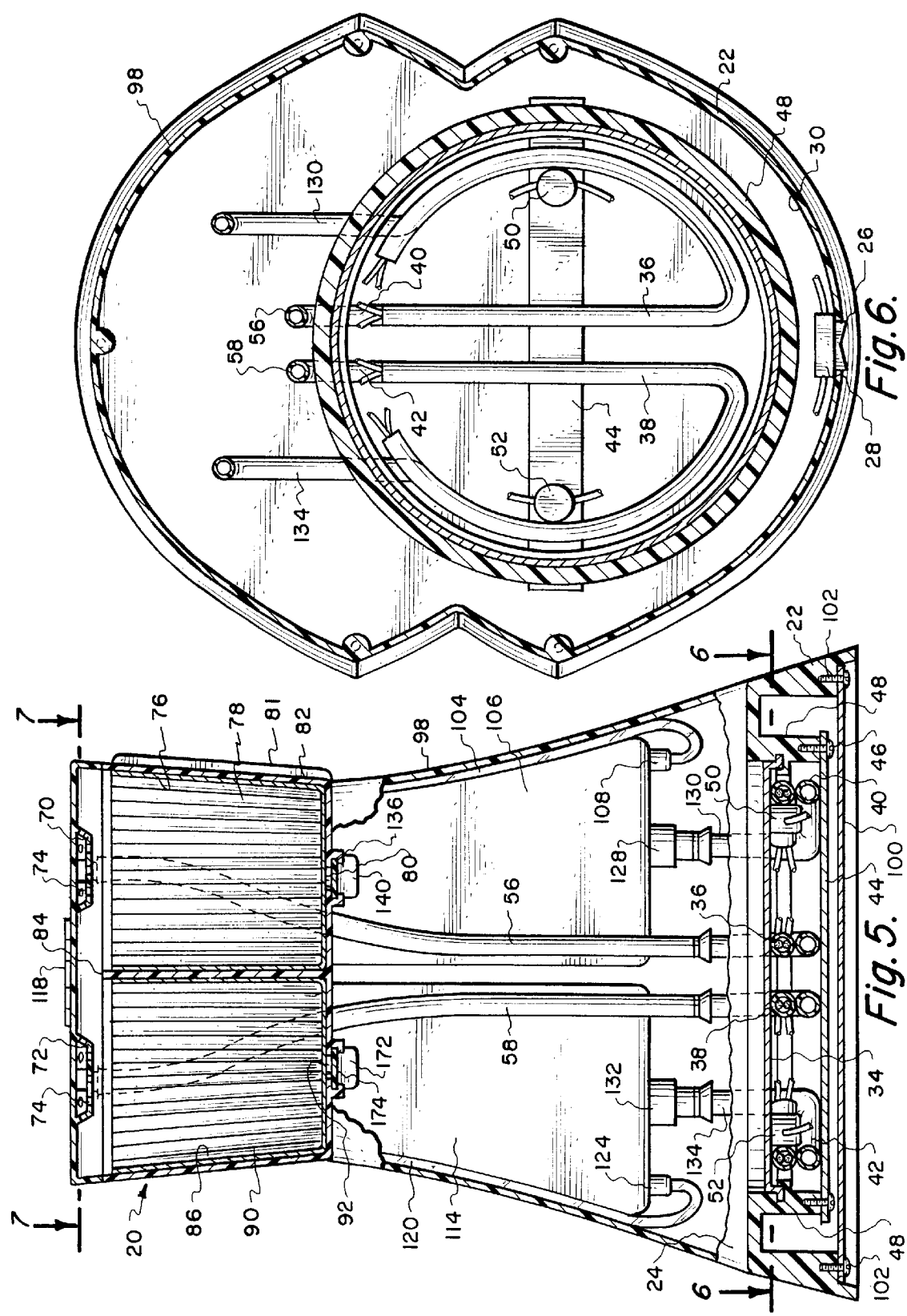

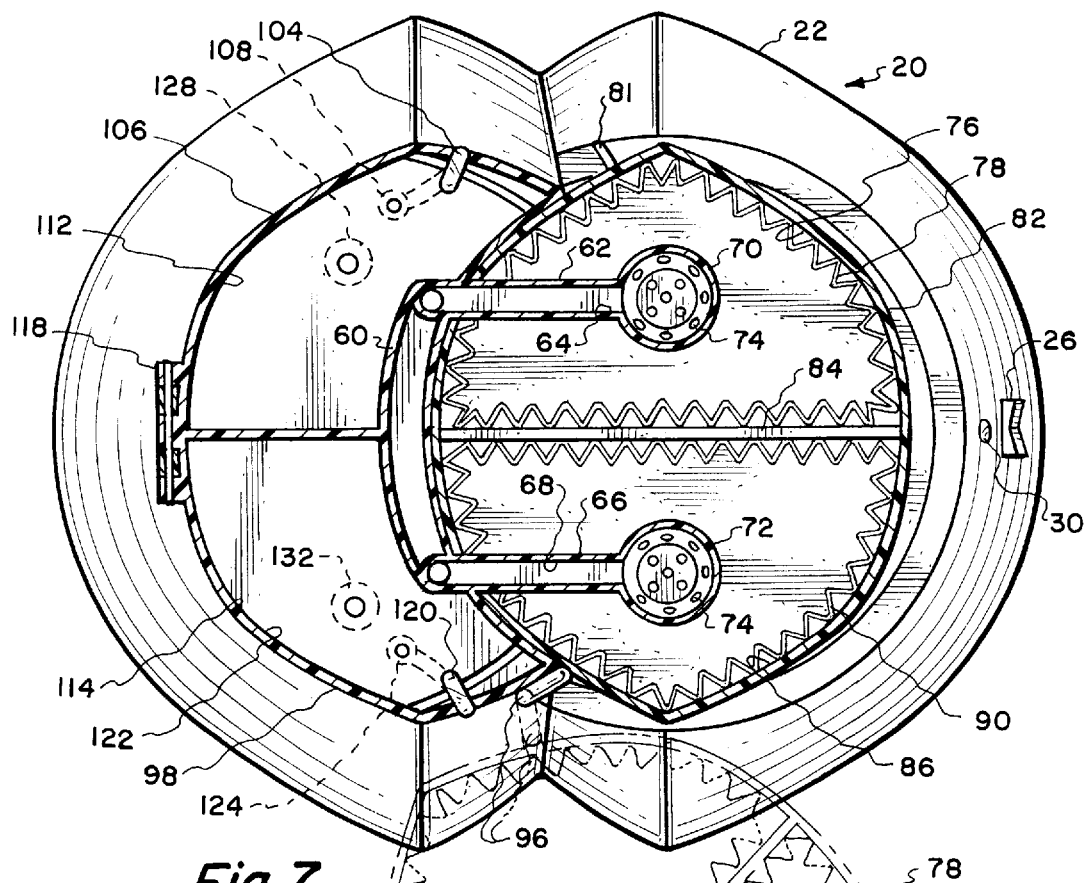

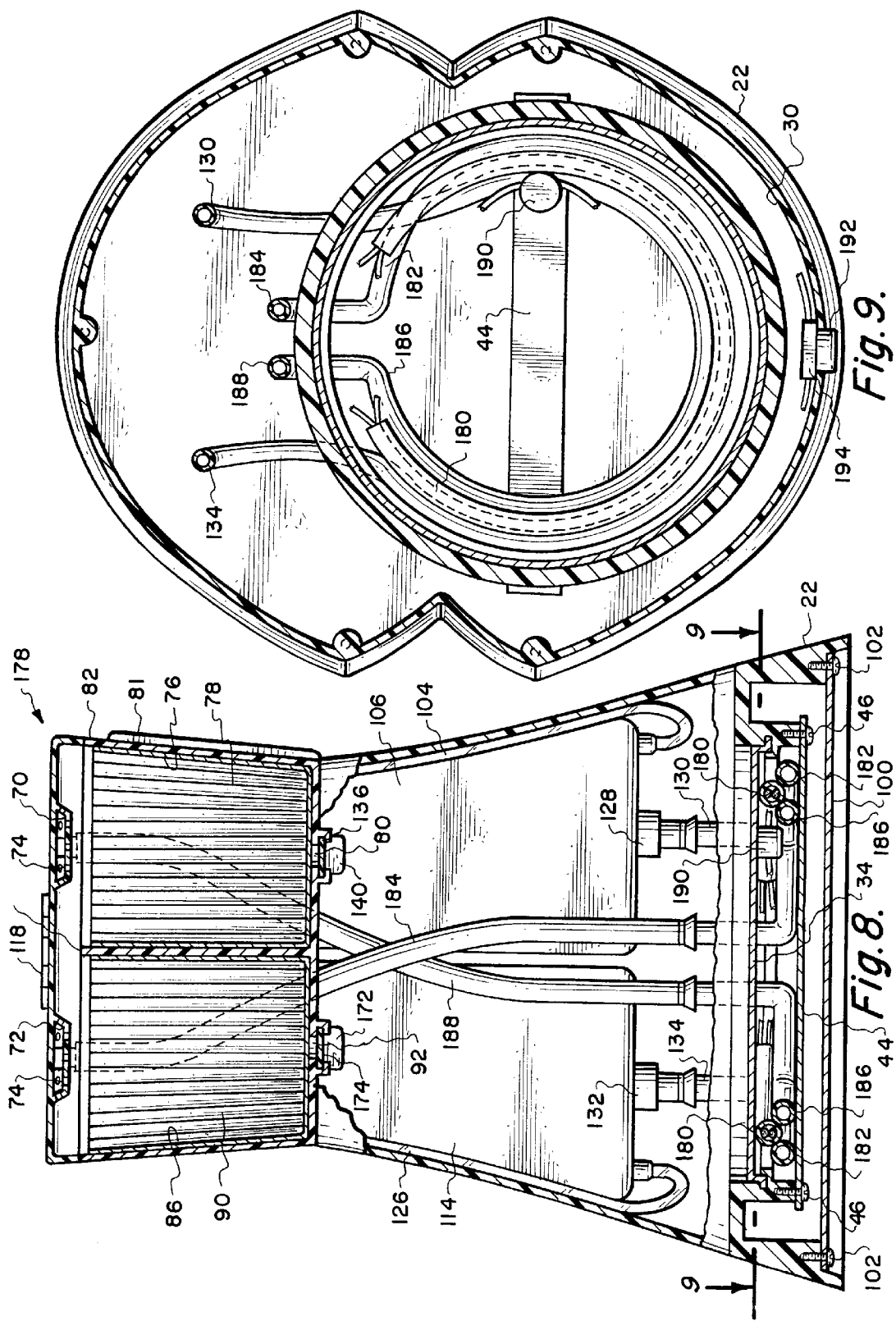

COFFEE BREWER

REFERENCE TO PRIOR APPLICATION

This application is a continuation-in-part of patent application Ser. No. 08/763,545, filed Dec. 10, 1996, entitled COFFEE BREWER, by Robert A. DeMars now abandoned.

BACKGROUND OF THE INVENTION

1) Field of the Invention

The field of this invention relates to coffee brewers and more particularly to a coffee brewer which is designed to achieve the brewing of two different types of coffee within the same coffee brewer with this brewing of both types of coffee being able to occur at the same time.

2) Description of the Prior Art

Coffee brewers have long been known and are in widespread use in the United States and foreign countries. The typical coffee brewer is to be usable to brew one particular type of coffee with this brewed coffee to be deposited within a single carafe that is incorporated in conjunction with the coffee brewer. The typical coffee brewer mounts the carafe on a warming plate. The warming plate is mounted within a base with this base being attached to a water tank housing. Mounted on the water tank housing is a filter basket. Water is to be moved from the water tank housing through a conduit that is mounted within the base with this conduit to be heated by a heater assembly resulting in boiling of the water located within the conduit. Ground coffee is placed within a filter basket in the brewer. This boiled water is conducted through an appropriate discharge conduit to the filter basket with this boiling water draining through ground coffee mounted within the filter basket producing brewed coffee that is deposited within the carafe. The carafe is generally round in shape and is to be disengagable from the coffee brewer in order to pour the brewed coffee from the carafe into a cup or similar type of drinking vessel.

Frequently within a home or place of business, it may be desired to brew two different types of coffee. One example would be to brew both caffeinated coffee and decaffeinated coffee at the same time. Also at times, it is desirable to brew two different types or flavors of coffee, both possibly could be decaffeinated or both could be caffeinated. In the past, it has been necessary to purchase two separate coffee brewers with each brewer being utilized to brew one particular coffee. Recently, there has been manufactured a single coffee unit that includes two separate round carafes, two separate warming plates, two separate water tanks and two separate filter baskets. Disadvantages of this dual type of coffee brewer include that it is rather large in size, unattractive in appearance and expensive to purchase.

SUMMARY OF THE INVENTION

One of the primary objectives of the present invention is to construct a coffee brewer which resembles in appearance the compact size of a single brewing unit but has the capability to brew two different types of coffee simultaneously or to brew just one type at a time.

Another objective of the present invention is to construct a coffee brewer which utilizes two different carafes which are constructed to be placed together on a pair of warming plates and form the overall appearance of a single carafe and a single warming plate.

Another objective of the present invention is to construct each carafe that is utilized in conjunction with the coffee brewer of the present invention to have multiple pouring spouts with the brewed coffee to be poured from either pouring spout.

Another objective of the present invention is to construct a compact, dual function coffee brewer that can be manufactured and subsequently sold to the ultimate consumer at a reasonable cost.

Another objective of the present invention is to construct a coffee brewer which utilizes two different filters for brewing two different types of coffee simultaneously.

The subject invention is a coffee brewer which includes a base and within the base is mounted either a single warming plate or a pair of warming plates resembling in appearance a single warming plate. A heater assembly is associated with the single warming plate or the pair of warming plates and is mounted within the base. A pair of carafes is to be mountable on the single warming plate or the pair of warming plates with the carafes being located in a side-by-side relationship resembling in appearance a single carafe. A water tank housing is mounted on the base and within the water tank housing is a first water tank and a second water tank. The first water tank is to supply water to be boiled by the heater assembly and then deposited within a first filter basket which passes through a quantity of ground coffee located within the basket from which brewed coffee is produced and deposited within the first carafe. In a similar manner, water is to be supplied from the second water tank through the heater assembly to be deposited within a second filter basket which passes through a quantity of ground coffee located within the second filter basket with the resulting brewed coffee to be deposited within the second carafe.

BRIEF DESCRIPTION OF THE DRAWINGS

FIG. 3 is a cross-sectional view of the coffee brewer of the present invention taken along line 3—3 of FIG. 1 but with no carafe being mounted in conjunction with the coffee brewer;

FIG. 4 is a cross-sectional view similar to FIG. 3 but showing a carafe mounted in conjunction with the coffee brewer;

FIG. 5 is a cross-sectional view of the coffee brewer of the present invention taken along line 5—5 of FIG. 3;

FIG. 6 is a cross-sectional view taken through the base of the coffee brewer of the present invention taken along line 6—6 of FIG. 5 showing in more detail the heater assembly utilized in conjunction with the base;

FIG. 7 is a cross-sectional view taken along line 7—7 of FIG. 5 showing in more detail the filter basket utilized in conjunction with the coffee brewer of the present invention;

FIG. 8 is a view similar to FIG. 5 but showing a modified form of coffee brewer where there is used a single heater in conjunction with the warming plate where within FIGS. 5 and 6 there are used two separate heaters;

FIG. 9 is a cross-sectional view through the base of the coffee brewer of FIG. 8 taken along line 9—9 of FIG. 8 showing in more detail the heater assembly;

FIG. 10 is a cross-sectional view through the base of the coffee brewer of the present invention showing a modification in the construction of the heating unit of FIG. 8;

DETAILED DESCRIPTION OF THE PREFERRED EMBODIMENT

Figure 1:
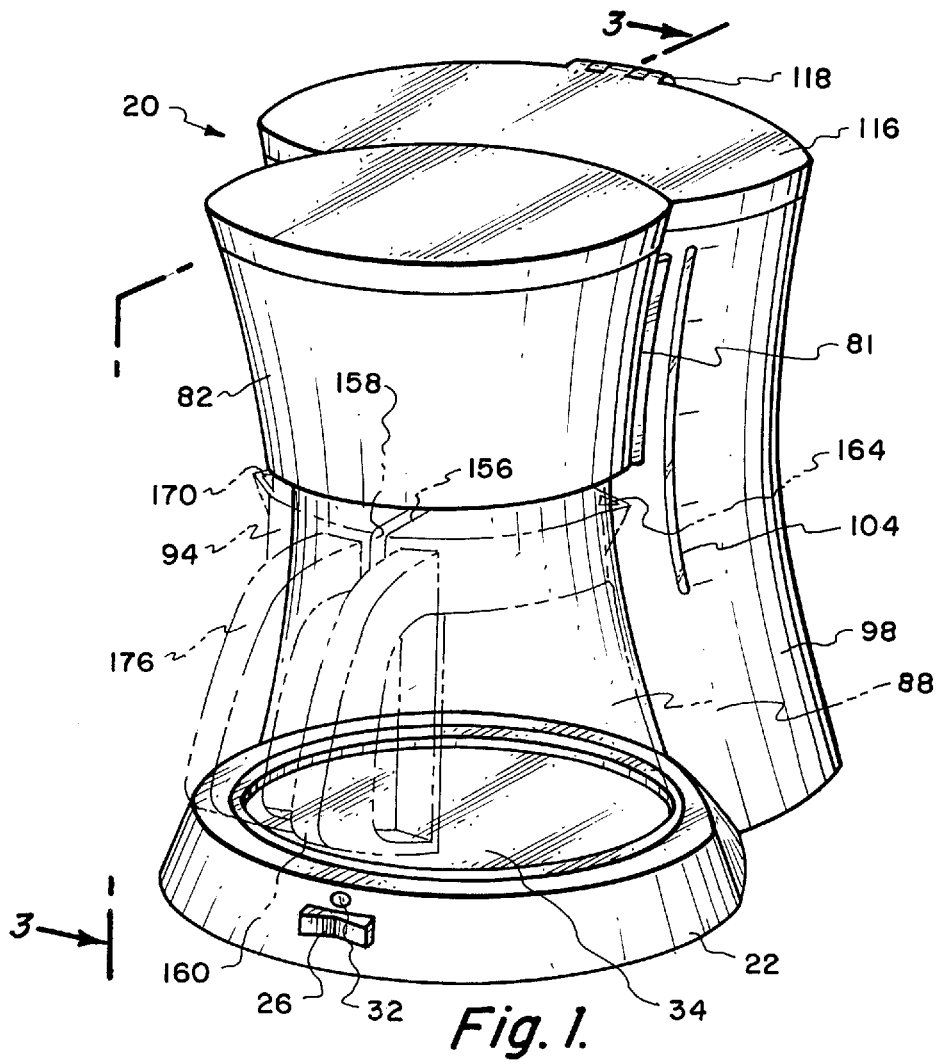
FIG. 1 is a front isometric view of the dual coffee brewer of the present invention which uses a single warming plate.
Figure 2:
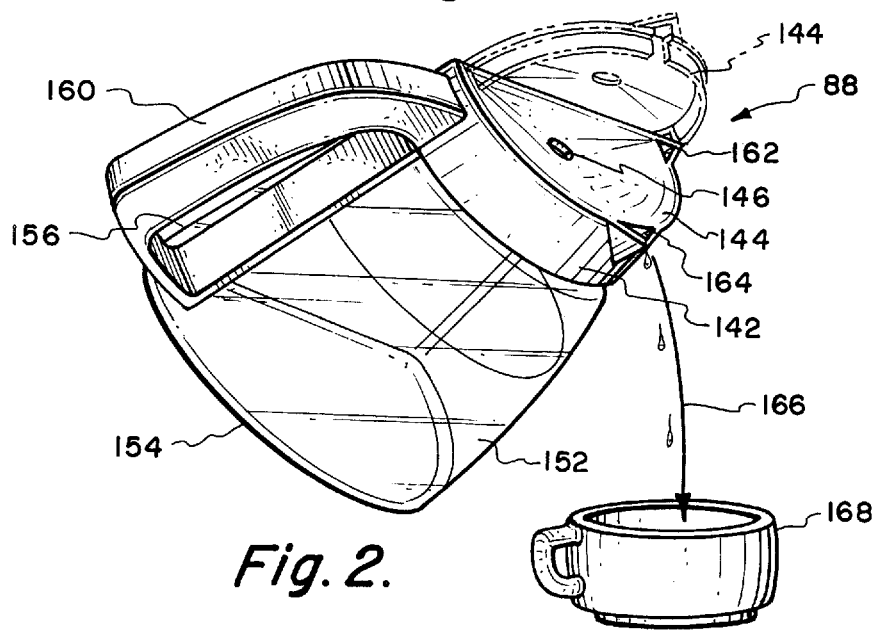
FIG. 2 is an isometric view of one of the carafes utilized in conjunction with the coffee brewer of the present invention showing usage of one carafe to pour coffee through one of the multiple pouring spouts incorporated within the carafe.

Referring particularly to FIGS. 1 and 2 of the drawings, there is shown the coffee brewer 20 of this invention. The coffee brewer 20 is constructed of a plastic base 22 which is integrally connected to an upstanding wall 24. Mounted within the base 22 is a switch button 26. Switch button 26 is mounted on switch housing 28 which is fixedly mounted within internal chamber 30 of the base 22. Indicator light 32 is also mounted on the switch housing 28 and protrudes exteriorly of the base 22 directly adjacent the button 26. The function of the button 26, switch housing 28 and indicator light 32 will be explained further on in the specification.

Mounted within the base 22 is a warming plate 34. The warming plate 34 will normally be constructed of a metallic material and will be formed in a sheet material configuration. The warming plate 34 is planer and circular in shape. Mounted against the undersurface of the warming plate 34 is a pair of heating coils 36 and 38. The pair of heating coils 36 and 38 applies only to FIGS. 1–6, 11, 12 and 13 of the drawings. Heating coils 36 and 38 receive electrical energy from a source (not shown) which normally will comprise conventional 110 volt alternating current, commonly referred to as household current. Pushing of the right side of button 26 will turn on heating coil 36. Pushing of the left side of switch button 26 will turn on heating coil 38. On the underside of heating coil 36 is mounted a water conduit 40. In a similar manner, mounted on the undersurface of the heating coil 38 is a water conduit 42. Water conduits 40 and 42 and heating coils 36 and 38 are held in their established position by a thin plate 44 as shown in FIGS. 3, 4, 5 and 6 of the drawings. Thin plate 44 is basically in the shape of a strip. Thin plate 44 is securely mounted at each end by means of screw fasteners 46 into an annular wall 48. Annular wall 48 is integral with the base 22. Mounted on the undersurface of the warming plate 34 is a pair of transducers 50 and 52. Transducers 50 and 52 are also mounted directly against their respective heating coils 36 and 38. It is the function of the transducers 50 and 52 to prevent overheating of the warming plate 34. Therefore, it is the function of the transducers 50 and 52 to shut off the energy being supplied to the heating coils 36 and 38 when overheating becomes a possibility. When overheating is no longer a possibility, the transducers 50 and 52 will then permit reactivation of the heating coils 36 and 38.

A hollow chamber 54 is located directly adjacent the inside surface of the upstanding wall 24. Located within the hollow chamber 54 is a pair of water discharge conduits 56 and 58. Water discharge conduit 56 is connected to the water conduit 40. Water discharge conduit 58 is connected to the water conduit 42. The outer end of the discharge conduits 56 and 58 is mounted within support walls 60. A tube 62, which has an interior passage 64, connects with the support wall 60. The passage 64 is to receive boiling water from a water discharge conduit 56. In a similar manner a tube 66, which has an internal passage 68, is mounted on the support wall 60 with the passage 68 to receive boiling water from the water discharge conduit 58.

Boiling water from passage 64 is to be deposited within nozzle 70. Water from the passage 68 is to be deposited within nozzle 72. Both nozzles 70 and 72 are essentially identical and each basically in the shape of a disk which includes a series of holes 74. The boiling water from passage 64 is to be passed through the holes 74 of the disk 70 and into filter basket chamber 76. A piece of filter paper 78 is to be located within the chamber 76. Coffee grounds (not shown) are to be located in conjunction with the filter paper 78. The hot water from the passage 64 is to be conducted through the coffee grounds and the filter paper 78, and then through aperture 80 and the filter basket 82. The filter basket 82 is actually divided in half by dividing wall 84 so that there is a second filter basket chamber 86 which is the same size as filter basket chamber 76. The water that is conducted through the aperture 80 is then to be deposited within carafe 88. The carafe 88 is located on the right side of the warming plate 34. The heating coil 36 is to function to keep the brewed coffee warm that is located within the carafe 88.

The boiled water that is conducted through the passage 68 and discharged through holes 74 of the nozzle 72 is applied against a quantity of ground coffee that is supported by the filter paper 90 which is placed within the filter basket chamber 86. The brewed coffee that passes through the filter paper 90 is then conducted through aperture 92 to be deposited within carafe 94. Carafe 94 also rests on the warming plate 34, but on the left side of the plate 34 abutting against carafe 88. It is to be understood that carafes 94 and 88 will normally be constructed of glass.

The filter basket 82 is integrally attached to protrusion 96. Protrusion 96 is pivotally mounted onto tank housing 98. Filter basket 82 is pivotable by protrusion 96 relative to base 22. The pivoting is to occur manually by the user grabbing handle 81. The filter basket 82 is to be pivoted to the dotted line position in FIG. 7 so coffee grounds can be placed in either or both filter basket chambers 76 and 186. This is the filling position. The brewing position is when the filter basket 82 is in the solid line position of FIG. 7.

Tank housing 98 is integral with base 22. The lower end of the tank housing 98 and the base 22 is to be closed by means of a bottom plate 100. The bottom plate 100 is fixedly mounted by fasteners 102 to the base 22 and to the tank housing 98. The plate 100 will normally be constructed of a metallic material.

Mounted within the tank housing 98 is a water level gauge 104. The water level gauge 104 is to indicate how much water is contained within water tank 106 which is mounted within the tank housing 98. The water level gauge comprises a tube which is fixedly mounted by connector 108 into the bottom surface of the water tank 104 with the upper end 110 of the water level gauge 104 being open into the interior chamber 112 of the water tank 106. There is a similar water level gauge 120 for the interior chamber 122 of the water tank 114. The water level gauge 120 is mounted to the bottom wall of the water tank 114 by means of connector 124. The tube which comprises the water level gauge 120 also terminates in an open upper end 126 which is open to the interior chamber 122. The water tanks 106 and 114 are of the same size in volume. Water is to be supplied into the tanks 106 and 114 by the lifting of the lid 116 covering the tank access opening. Lid 116 is pivotally mounted by hinge 118 to the tank housing 98.

It is to be understood that water is to be poured into either or both of the interior chambers 112 and 122 with the lid 116 in the open position. The water is then conducted from the bottom of tank 106 through connector 128 to water supply conduit 130. Conduit 130 feeds the water into water conduit 40. In a similar manner the water within the water tank 114 is passed through connector 132 into water supply conduit 134. The water within the water conduit 134 is conducted to within water conduit 42. It is to be understood that there will be incorporated one or more valves (not shown) within conduits 130 and 134 and/or conduits 56 and 58.

When carafe 88 is not located on the warming plate 34, it is desirable that the aperture 80 be closed in order to prevent brewed coffee from spilling onto the warming plate 34. In order to prevent this there is mounted a closure plate 136 on the underside of the filter basket 82. The closure plate 136 is normally biased by means of a coil spring 138 so that the plate 136 will close the aperture 80. Coil spring 138 acts against flange 140 of the closure plate 136 which is integrally connected to the closure plate 136. However, when the carafe 88 is inserted in position on the warming plate 34, the rim cover 142 of the carafe 88 will come into contact with the flange 140 and compress the spring 138 opening the aperture 80 through which coffee is then capable of being discharged and flowing onto carafe lid 144. Carafe lid 144 is formed slightly recessed and has a center hole 146. The brewed coffee from aperture 80 is to be conducted onto the surface of the lid 144 and then flow through the center hole 146 into the interior chamber 148 of the carafe 88. The lid 144, as well as the rim cover 142, is capable of being snapped onto and off of the rim 150 of the carafe 88. In order to gain access for cleaning, carafe lid 144 is capable of being unsnapped from the rim cover 142 and pivoted to the open position which is shown in dotted lines in FIG. 2. The lid 144 is to be hingedly connected as by a "living hinge" to rim cover 142.

Figure 11:
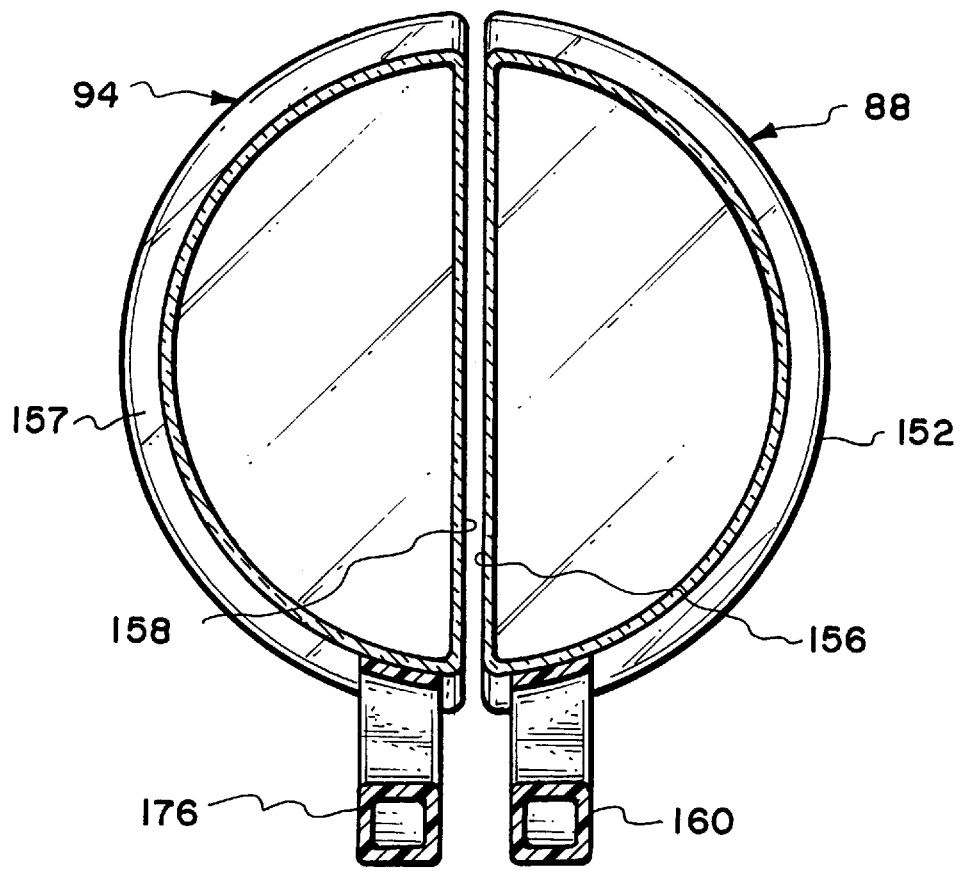
FIG. 11 is a transverse cross-sectional view through the pair of carafes shown in FIG. 1 used with the coffee brewer of this invention.

The sidewall body 152 of the carafe 88 is primarily arcuate being wider at the bottom 154 than at the rim 150. However, the portion of the sidewall body 152 of the carafe 88 is planer that is located directly adjacent the carafe 94. This planer wall 156 of carafe 88 faces directly adjacent a similar planer wall 158 of the sidewall body 157 of the carafe 94 (FIG. 11). These planer walls of the carafes 88 and 94 establish a configuration of the carafes 88 and 94 that permits such to both be located on a warming plate 34. The warming plate 34 is shown to be circular which is deemed to be conventional; however, it is within the scope of this invention that another shape of warming plate 34 could be utilized.

The rim cover 142 is integrally connected to a handle 160. The handle 160 is to facilitate manual picking up and removal of the carafe 88 from the warming plate 34. Brewed coffee that is located within the interior chamber 148 is to be capable of being poured from the interior chamber 148. This is accomplished by removing the body 152 of the carafe 88 and tilting it in either a forward tilt position or a sideways tilt position. When tilted in the forward tilt position, the brewed coffee is to be poured through spout 162. When tilted sideways, the brewed coffee is to be poured through spout 164. In referring to FIG. 2, the brewed coffee is shown being poured by arrow 166 from the spout 164 into a coffee cup 168. It is to be understood that the carafe 94 has a similar pair of spouts with only the sideways spout 170 being shown.

It is to be noted that in relation to the switch button 26 that there is shown only one indicator light 32. The indicator light 32 is to be lit when the coffee brewer 20 is activated. However, more than likely there will be a separate indicator light 32 for each carafe 88 and 94 so it can be quickly observed whether the right-hand or left-hand brew path is activated, or if both paths have been activated.

It is to be understood that carafe 94 is to come in contact with a flange 172 of a closure plate 174 which is also slidingly mounted in the same manner as closure plate 136 on the undersurface of filter basket 82. The closure plate 174 functions to close aperture 92 which supplies brewed coffee from the filter basket chamber 86 into the carafe 94. Carafe 94 also has a handle 176 which is to be used to pour the brewed coffee from the carafe 94.

Referring particularly to FIGS. 8 and 9 of the drawings, there is shown a coffee brewer 178 which is basically similar to the coffee brewer 20 and like numerals have been utilized to refer to like parts. The main distinction of the coffee brewer 178 from coffee brewer 20 is that there is a single heating coil rather than the two separate heating coils 36 and 38 of the coffee brewer 20 shown in FIGS. 1–7. The water supply conduit 134 supplies water into basically circular shaped water conduit 182. From water conduit 182 water is conducted into water discharge conduit 184. In a similar manner water from the water supply conduit 130 is conducted into circular shaped water conduit 186. From water conduit 186 the water is conducted into water discharge conduit 188. Discharge conduit 188 connects with filter basket chamber 76 with water discharge conduit 184 connecting with filter basket chamber 86. This means that the conduits 184 and 188 are crossed as is clearly shown in FIG. 8. The water conduits 182 and 186 are positioned to be in contact with the heating coil 180. The thin plate 44 is used to support the water conduits 182 and 186 and heating coil 180 in a proper position with the heating coil 180 also in contact with the undersurface of the warming plate 34.

Because there is only a single heating coil 180 utilized, there is only a need for a single transducer 190 which is to be in contact with both the heating coil 180 and the undersurface of the warming plate 34.

It is to be noted that the switch button 192 in FIG. 9 constitutes a single button which is to be pushed in order to operate the switch 194. In the embodiment of FIGS. 8 and 9 the entire coffee brewer is operated when the switch 194 is activated. If the operator wishes only to use one of the carafes 88 or 94, it is only necessary that the user insert water within the appropriate tank 106 or 114 leaving the other tank empty.

Referring particularly to FIG. 10 of the drawings, there is shown a further modified form of the base 22 where the heating coil 196, which is similar in shape to the heating coil 180, is mounted between water conduits 198 and 200. Again the water conduits 198 and 200 and the heating coil 196 are maintained in position by the thin plate 44. Conduit 198 is supplied water from water supply conduit 202 with the boiled water then being discharged into water discharge conduit 204. In a similar manner water is conducted from the water supply conduit 206 into water conduit 200 and from the water conduit 200 into water discharge conduit 208. The discharge conduits 204 and 208 are to be crossed in the same manner as in FIG. 8 in order to connect with the proper filter chambers 76 and 86. Transducer 210 is as before and in contact with the heating coil 196. Direct connection between transducer 210 and the warming plate 34 is accomplished by means of metallic block 212. The temperature of the warming plate 34 is transmitted through the metallic block 212 directly to the transducer 210.

Figure 12:
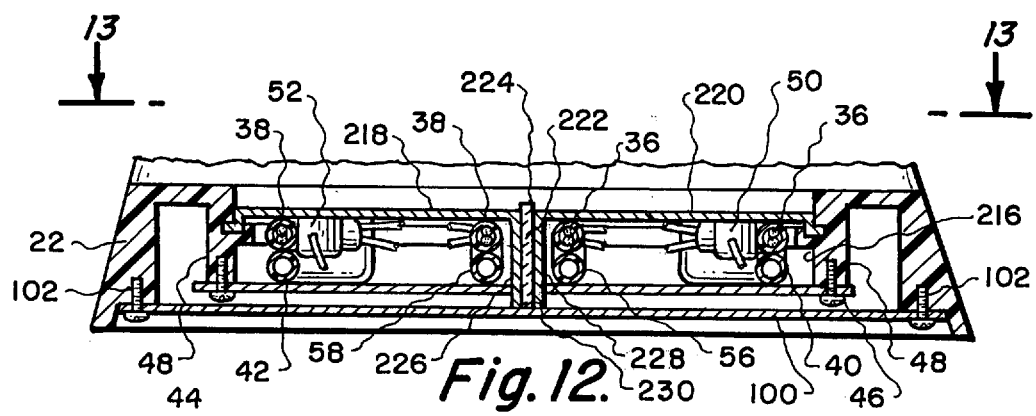
FIG. 12 is a cross-sectional view similar to FIG. 10 but where there are two separate warming plates rather than a single warming plate.
Figure 13:
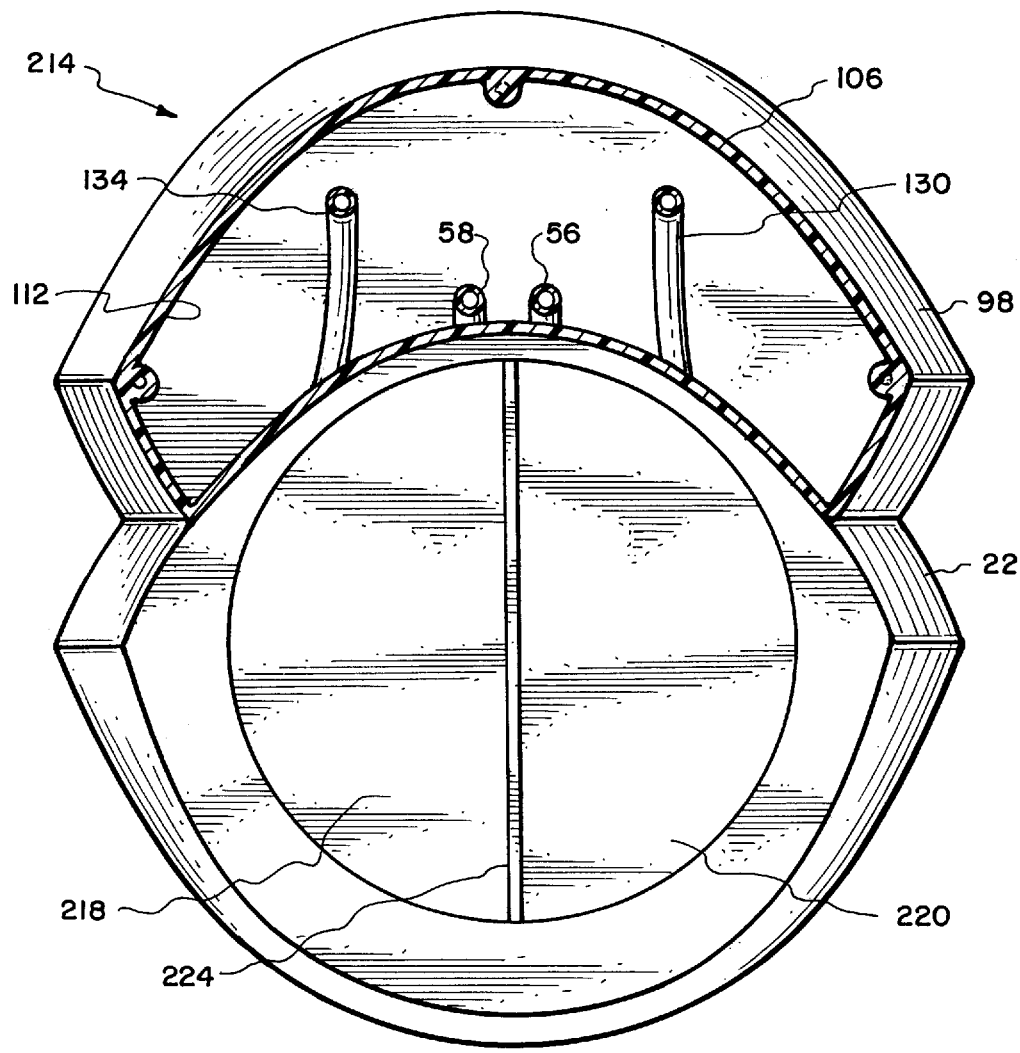
FIG. 13 is a transverse cross-sectional view taken along line 13—13 of FIG. 12.

Referring particularly to FIGS. 12 and 13, there is shown the coffee brewer 214 which has a plastic base 22, a tank housing 98, a water tank 106, water discharging conduits 56 and 58, and water supply conduits 130 and 134. The plastic base 22 also includes an annular wall 48 internally of which defines internal chamber 216. The upper end of the internal chamber 216 is closed by a pair of warming plates defined as first warming plate 218 and second warming plate 220. Each warming plate 218 and 220 is essentially half of a circle in area, and with the warming plates 218 and 220 placed side-by-side, there is essentially formed a completed circle. Mounted directly adjacent the underside of the warming plate 218 is a first unit which includes a heating coil 38. The heating coil 38 connects to a transducer 52 to prevent over heating of the warming plate 218. It is to be understood that the warming plate 218 as well as the warming plate 220 will be constructed of a heat conductive material such as a metal. Mounted directly adjacent the underside of the warming plate 220 is a second unit in the form of a heating coil 36 which is connected to a transducer 50. The heating coil 38 is mounted directly adjacent water conduits 42 and 58. Heating coil 36 is mounted directly adjacent water conduits 40 and 56. Heating coils 36 and 38 operate separately. For a description of the operation of the heating coils and their connected conduits, reference is to be had to the prior description.

The main distinction of FIG. 12 from FIG. 5 is that instead of a single warming plate, there are two separate warming plates 218 and 220. The warming plates 218 and 220 have an insulator panel 222 which is mounted therebetween. The insulator panel 222 is constructed of a non-heat conductive material with generally a ceramic or plastic material being preferred. It is to be noted that the upper end 224 of the insulator panel 222 protrudes above the upper planer surface defined by the warming plates 218 and 220. The reason for this is that when the carafes 88 and 94 are placed on their respective warming plates 220 and 218, the carafes 88 and 94 will be confined to their respective warming plate and not permitted to move over on the directly adjacent warming plate. The result, when the heating coil 38 is operated, only the warming plate 218 will be warmed. The same is true if the heating coil 36 is operated, only the warming plate 220 will be warmed. Also, physical contact of the carafes 88 and 94 is prevented by the insulator panel 222 which keeps the carafes 88 and 94 separated and also keeps the carafes 88 and 94 from clanging together.

The warming plate 218 includes a right-angled extension 226 which extends along the surface of the insulator panel 222 and abuts against the thin plate 44. In a similar manner, the warming plate 220 includes a right-angled extension 228 which abuts also against the insulator panel 222 and abuts against the thin plate 44. Thin plate 44 is mounted in the conventional manner by means of screw fasteners 46 to the plastic base 22. Thin plate 44 is then covered by the bottom plate 100 which is mounted by fasteners 102 into the plastic base 22. The inside or upper surface of the bottom plate 100 includes a groove 230. The lower end of the insulator panel 222 is snugly mounted within the groove 230.

What is claimed is:

1. A coffee brewer comprising:

a base, a warming plate assembly mounted within said base, said warming plate assembly adapted to support a carafe assembly;

a heater assembly mounted within said base, one purpose of said heater assembly is to raise the temperature of said warming plate assembly;

a first carafe and a second carafe locatable on said warming plate assembly, said first carafe being removable to be located a spaced distance from said warming plate assembly, said second carafe being removable to be located a spaced distance from said warming plate assembly;

a water tank housing mounted on said base, said water tank housing including a first water tank and a second water tank, said second water tank adapted to contain a quantity of water separate from said first water tank;

a filter basket housing mounted on said water tank housing, said filter basket housing including a first filter basket and a second filter basket, said first filter basket being separate from said second filter basket, said first filter basket adapted to contain a filter within which is to be located a quantity of ground coffee, said second filter basket adapted to contain a filter within which is to be located another quantity of ground coffee;

a pair of water supply conduits extending from said first and second water tanks connecting with said heater assembly, one said water supply conduit connecting with said first filter basket and the other said water supply conduit connecting with said second filter basket, whereby water within said water supply conduits is to be boiled by said heater assembly and conducted to a said filter basket resulting in coffee being brewed and deposited within a said carafe; and switch means mounted on said base, said switch means permitting selection of brewed coffee within said first carafe or brewed coffee within said second carafe or both.

2. The coffee brewer as defined in claim 1 wherein:
said heater assembly including a single heating unit, said single heating unit to be usable with both said first carafe and said second carafe.

3. The coffee brewer as defined in claim 1 wherein:
said heater assembly including two separate heating units defined as a first unit and a second unit, said first unit to be connected with said first carafe, said second unit to connect with said second carafe.

4. The coffee brewer as defined in claim 3 wherein:
said warming plate assembly comprising a pair of warming plates separated by an insulator panel, said pair of warming plates being defined as a first warming plate and a second warming plate, said first unit to connect only with said first warming plate, said second unit to connect only with said second warming plate, whereby when said first warming plate is heated said second warming plate is not heated and vice versa.

5. The coffee brewer as defined in claim 1 wherein:
said first carafe and said second carafe being constructed so that when said first carafe is in juxtaposition with said second carafe the general overall appearance is that of a single carafe.

6. The coffee brewer as defined in claim 1 wherein:
said filter basket housing being pivotally mounted on said water tank housing, said filter basket housing being movable relative to said water tank housing between a brewing position and a filling position, said filling position locates said filter basket housing spaced from said water supply conduits thereby permitting access to said first filter basket and said second filter basket.

7. The coffee brewer as defined in claim 6 wherein:
said first filter basket being removable from said filter basket housing, said second filter basket being removable from said filter basket housing.

8. The coffee brewer as defined in claim 1 wherein:
said first carafe having a first handle, said second carafe having a second handle, said first handle to be in juxtaposition with said second handle when said first carafe and said second carafe are mounted on said warming plate assembly.

9. The coffee brewer as defined in claim 1 wherein:

said first carafe having a first sidewall, said second carafe having a second sidewall, said first sidewall including a first planer wall, said second sidewall including a second planer wall, said first planer wall to be located directly adjacent said second planer wall when said first carafe and said second carafe are mounted on said warming plate assembly.

10. The coffee brewer as defined in claim 9 wherein:

a portion of said first sidewall other than said first planer surface being arcuate, the portion of said second sidewall other than said second planer surface being arcuate.

11. The coffee brewer as defined in claim 1 wherein:

said first carafe having multiple pouring spouts, said second carafe have multiple pouring spouts.

12. In combination with a coffee brewer, said coffee brewer having a warming plate assembly, the improvement comprising:

said warming plate assembly comprising multiple separate warming plates with each said warming plate to connect only with a separate heater unit with there being a separate said heater unit for each said warming plate, whereby each said warming plate is only heated by its respective said heater unit;

a pair of carafes mounted on said warming plate assembly with one said carafe connecting only with one said warming plate and the remaining said carafe connecting only with the remaining said warming plate, whereby each said carafe is to be heated only by its respective said heater unit; and each said carafe having a planer sidewall, when said carafes are mounted on said warming plate assembly said planer sidewalls are located directly adjacent each other.

13. The combination as defined in claim 12 wherein:

each said carafe having an arcuate sidewall connecting with its respective said planer sidewall.

14. In combination with a coffee brewer, said coffee brewer having a warming plate assembly, the improvement comprising:

said warming plate assembly defining a single circular shaped unit which is divided into a pair of separate warming plates with each said warming plate to connect only with a separate heater unit for each said warming plate with there being a separate said heater unit for each said warming plate, whereby each said warming plate is only heated by its respective said heater unit.

15. The combination as defined in claim 14 including:

a pair of carafes mounted on said warming plate assembly with one said carafe connecting only with one said warming plate and the remaining said carafe connecting only with the remaining said warming plate, whereby each said carafe is to be heated only by its respective said heater unit.

16. The combination as defined in claim 15 wherein:

each said carafe having a planer sidewall, when said carafes are mounted on said warming plate assembly said planer sidewalls are located directly adjacent to each other.

* * * * *